United States Patent Office 3,109,859
Patented Nov. 5, 1963

3,109,859
DISUBSTITUTED GUANIDINES
Arthur F. McKay, Beaconsfield, Quebec, and David L. Garmaise, Montreal, Quebec, Canada, assignors to Monsanto Canada Limited, La Salle, Quebec, Canada
No Drawing. Filed Oct. 11, 1961, Ser. No. 144,304
Claims priority, application Great Britain Oct. 21, 1960
7 Claims. (Cl. 260—564)

This invention relates to disubstituted guanidines and their salts and to compositions in which they are active constituents.

According to a first feature of the present invention there are provided disubstituted guanidines of the formula

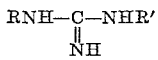

wherein R is a benzyl or a benzyl substituted with one or two chlorine radicals and R' is a straight chain alkyl radical containing from 8 to 12 carbon atoms or wherein R and R' are both 3,4-dichlorobenzyl.

According to a further feature of this invention there are provided compositions containing disubstituted guanidines possessing high bacteriocidal and fungicidal activity.

The compounds of the above formula are unexpectedly potent bacteriostats effective against both gram-positive and gram-negative organisms. For example N-(3,4-dichlorobenzyl)N'-(n-dodecyl)-guanidine hydrochloride inhibits the growth of the following organisms at the dilutions indicated: *Staph. pyogenes* (penicillin sensitive) (1:20,480,000), *Staph. pyogenes* (pencillin resistant) 1:- 20,480,000), *Sarcina lutea* (1:5,120,000), *Strept. faecalis* (1:1,280,000), *E. coli* No. 198 (1:320,000), *Aero aerogenes* (1:40,000), *S. pullorum* (1:1,280,000), *Ps. aeruginosa* (1:10,000), *Pr. mirabilis* (1:1,280,000), and *Pr. vulgaris* (1:1,280,000).

These compounds also possess fungicidal activity. For example, when tested against *Candida albicans, Microsporum gypseum* and *Trichophytum granulosum* the minimum concentrations of N-(3,4-dichlorobenzyl)-N'-(n-nonyl)-guanidine hydrochloride to prevent growth of such fungi were 1:128,000; 1:1,024,000; and 1:1,024,000 respectively.

The compounds of the present invention are useful as industrial preservatives, general disinfectants, and for topical applications in the treatment of infected skin areas.

In the process for the production of a disubstituted quanidine of the foregoing general formula a monosubstituted thiourea of the formula

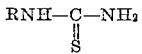

in which R is a benzyl or a benzyl substituted with one or two chlorine radicals is reacted with an S-alkylating agent, for example methyl iodide, or methyl chloride and the resulting product reacted with an amine R'NH₂ in which R' is a 3,4-dichlorobenzyl or a straight chain alkyl radical containing from 8 to 12 carbon atoms. When the alkylating agent is an alkyl iodide the product is obtained as the hydroiodide salt. The hydroiodide salt is converted to the hydrochloride salt by passing a methanolic soluction of the hydroiodide compound through a column of an ion-exchange resin of the quaternary ammonium type which had been previously saturated with chloride ion.

The reaction is readily accomplished at room temperatures though higher temperatures result in a shorter reaction period.

Although the products of this invention are useful per se in controlling a wide variety of noxious life, it is preferable that they be supplied to noxious life or to the environment of the noxious life in a dispersed form in a suitable extending agent.

In the instant specification and appended claims it is to be understood that the term "dispersed" is used in its widest possible sense. When it is said that the reaction products of this invention are dispersed it means that the particles of the reaction products of this invention may be molecular in size and held in true solution in a suitable organic solvent. It means further that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting emulsifying agents. The term "dispersed" also means that the particles may be mixed with and distributed throughout a solid carrier providing a mixture in particulate form, e.g. pellets, tablets, granules, powders, or dusts.

In the instant specifications and appended claims it is to be understood that the expression "extending agent" includes any and all of those substances in which the reaction products of this invention are dispersed. It includes, therefore, the solvents of a true solution, the liquid phase of suspensions or emulsions, the semi-solid carrier of ointments and the solid phase of particulate solids, e.g. pellets, tablets, granules, dusts and powders.

The exact concentration of the reaction products this invention employs in combatting or controlling noxious life can vary considerably provided the required dosage (i.e. toxic or lethal amount) thereof is supplied to the noxious life or to the environment of the noxious life. When the extending agent is a liquid or mixture of liquids (e.g. as in solutions, suspensions, emulsions, etc.) the concentration of the reaction product employed to supply the desired dosage generally will be in the range of 0.01 to 25 percent by weight. When the extending agent is a semi-solid, or solid, the concentration of the reaction product employed to supply the desired dosage generally will be in the range of 0.1 to 25 percent by weight.

The invention is illustrated but not limited by the following examples in which the parts are by weight.

EXAMPLE I

*N,N'-Di-(3,4-Dichlorobenzyl)-Guanidine*

3,4-dichlorobenzyl thiourea (12.95 parts) was added to methyl iodide (7.8 parts) in ethanol (40 parts) and the solution was stirred at room tempearture for 3 hours. The solution was evaporated to dryness at room temperature and the residue was crystallized from ether giving N-(3,4-(dichlorobenzyl) - S - methylseudothiourea hydroiodide, M.P. 123–125°, yield 18.5 parts (95% of theory).

*Analysis.*—Percent calculated for $C_9H_{11}Cl_2IN_2S$: C, 28.67; H, 2.94; halogen, 52.40; N, 7.43; S, 8.50. Found: C, 28.96; H, 3.21; halogen, 52.16; N, 7.49; S, 8.37.

3,4-dichlorobenzylamine (1.76 parts) was added to N-(3,4-dichlorobenzyl)-S - methylpseudothiourea hydroiodide (3.77 parts) in ethanol (20 parts) and the solution was refluxed for 3 hours. Evaporation of the solution and crystallization of the residue from ethanol and ether gave N,N'-di-(3,4-dichlorobenzyl)-guanidine hydroiodide, M.P. 148–150°, yield 3.5 parts (69.5% of theory).

*Analysis.*—Percent calculated for $C_{15}H_{14}Cl_4IN_3$: C, 35.67; H, 2.79; halogen, 53.20; N, 8.32. Found C, 35.21; H, 3.28; halogen, 53.32; N. 8.62.

A solution of the hydroiodide salt (1.5 parts) in methanol (60 parts) was passed through a column of an ion-exchange resin (50 parts) of the quaternary type which had been previously saturated with chloride ion. The column was washed with methanol (50 parts) and the combined effluent and washings were evaporated to dryness. Crystallization of the residue from ethanol and chloroform gave N,N'-di-(3,4-dichlorobenzyl)-guanidine hydrocloride, M.P. 153–154°, in quantitative yield (1.2 parts).

*Analysis.*—Percent calculated for $C_{15}H_{14}Cl_5N_3$: C, 43.46; H, 3.41; Cl, 42.77; N, 10.16. Found: C, 43.43; H, 3.62; Cl, 42.96; N, 9.84.

EXAMPLE II

N-(3,4-Dichlorobenzyl)-N'-(n-Octyl)-Guanidine n-Octylamine was refluxed with N-(3,4-dichlorobenzyl)-S-methylpseudothiourea hydroiodide in ethanol as in Example I giving N-(3,4-dichlorobenzyl)-N'-(n-octyl)-guanidine hydroiodide, M.P. 109–110°, yield 67.7% of theory.

*Analysis.*—Percent calculated for $C_{16}H_{26}Cl_2IN_3$: C, 42.00; H, 5.73; halogen, 43.19; N, 9.17. Found: C, 42.12; H, 5.91; halogen, 43.34; N, 8.98.

The hydroiodide salt was converted to the armorphous hydrochloride salt as in Example 1.

EXAMPLE III

N-(3,4-Dichlorobenzyl)-N'-(n-Nonyl)-Guanidine n-Nonylamine (1.55 parts) was added to N-(3,4-dichlorobenzyl)-S-methylpseudothiourea hydroiodide (3.77 parts), and the mixture was heated at 120° for one hour. The cooled reaction mixture was crystallized from ethanol and ether, giving N-(3,4-dichlorobenzyl)-N'-(n-nonyl)-guanidine hydroiodide, M.P. 93–94°, yield 4.5 parts (99% of theory).

*Analysis.*—Percent calculated for $C_{17}H_{28}Cl_2IN_3$: C, 43.27; H, 5.98; halogen, 41.86; N, 8.89. Found: C, 43.16; H, 6.01; halogen, 41.50; N, 9.18.

The hydroiodide salt was converted as in Example I to the hydrochloride salt, M.P. 57–59°, yield 80% of theory.

*Analysis.*—Percent calculated for $C_{17}H_{28}Cl_3N_3$: C, 53.60; H, 7.42; Cl, 27.95; N, 11.03. Found: C, 53.42; H, 7.13; Cl 28.00; N, 11.35.

EXAMPLE IV

N-(3,4-Dichlorobenzyl)-N'-(n-decyl)-Guanidine n-Decylamine was treated with N-(3,4-dichlorobenzyl)-S-methylpseudothiourea hydroiodide as in Example III, giving N-(3,4-dichlorobenzyl)-N-(n-decyl)-guanidine hydroiodide, M.P. 98–100°, yield 84% of theory.

*Analysis.*—Percent calculated for $C_{18}H_{30}Cl_2IN_3$: C, 44.45; H, 6.22; halogen, 40.66; N, 8.64. Found: C, 44.62; H, 6.21; halogen, 40.67; N, 8.64.

The hydroiodide was converted as in Example I to the hydrochloride salt, M.P. 69–71°, yield 99% of theory.

*Analysis.*—Percent calculated for $C_{18}H_{30}Cl_3N_3$: C, 54.75; H, 7.66; Cl, 26.93; N, 10.64. Found: C, 54.49; H, 7.65; Cl, 27.15; N, 10.43.

EXAMPLE V

N-(3,4-Dichlorobenzyl)-N'-(n-Undecyl)-Guanidine n-Undecylamine was treated with N-(3,4-dichlorobenzyl)-S-methylpseudothiourea hydroiodide as in Example III giving N-(3,4-dichlorobenzyl)-N'-(n-undecyl)-guanidine hydroiodide, M.P. 95–96°, yield 60% of theory.

*Analysis.*—Percent calculated for $C_{19}H_{32}Cl_2IN_3$: C, 45.80; H, 6.02; halogen, 39.70; N, 8.43. Found: C, 45.53; H, 6.40; halogen, 39.83; N, 8.50.

The hydroiodide salt was converted as in Example I to the hydrochloride salt, M.P. 67–69°, yield 95.0% of theory.

*Analysis.*—Percent calculated for $C_{19}H_{32}Cl_3N_3$: C, 55.80; H. 7.84; Cl, 26.08; N, 10.28. Found: C, 55.89; H, 7.90; Cl, 26.59; N, 10.40.

EXAMPLE VI

N-(3,4-Dichlorobenzyl)-N'-(n-Dodecyl)-Guanidine n-Dodecyl was treated with N-(3,4-dichlorobenzyl)-S-methylpseudothiourea hydroiodide as in Example III, giving N-(3,4-dichlorobenzyl)-N'-(n-dodecyl)-guanidine hydroiodide, M.P. 96–97°, yield 67% of theory.

*Analysis.*—Percent calculated for $C_{20}H_{34}Cl_2IN_3$: C, 46.71; H, 6.66; halogen, 38.46; N, 8.17. Found: C, 46.65; H, 6.46; halogen, 38.90; N, 8.39.

The hydroiodide salt was converted as in Example I to the hydrochloride salt, M.P. 59–60°, yield 81% of theory.

EXAMPLE VII

N-(4-Chlorobenzyl)-N'-(n-Nonyl)-Guanidine 4-chlorobenzylthiourea (24.5 parts) was added to methyliodide (17.3 parts) in ethanol (40 parts), and the solution was stirred at room temperature for 3 hours. The solution was evaporated at room temperature, and the residue was crystallized from ether (20 parts) to give S-methyl-4-chlorobenzylpseudothiourea hydroiodide, M.P. 92–95°, yield 37.5 parts (89.6% of theory).

*Analysis.*—Percent calculated for $C_8H_{12}ClIN_2S$: C, 31.54; H, 3.53; total halogen, 47.38; N, 8.18; S, 9.36. Found: C, 31.10; H, 3.81; total halogen, 47.64; N, 8.09; S, 9.44.

n-Nonylamine was treated with N-(4-chlorobenzyl)-S-methylpseudothiourea hydroiodide as in Example III, giving N-(4-chlorobenzyl)-N'-(n-nonyl)-guanidine hydroiodide, M.P. 85–86°, yield 96% of theory.

*Analysis.*—Percent calculated for $C_{17}H_{29}ClIN_3$: C, 46.67; H, 6.67; halogen, 37.08; N, 9.08. Found: C, 46.92; H, 6.71; halogen, 36.98; N, 9.55.

The hydroiodide salt was converted as in Example I to the hydrochloride salt, M.P. 67–68°, yield 99% of theory.

*Analysis.*—Percent calculated for $C_{17}H_{29}Cl_2N_3$: C, 58.95; H, 8.44, Cl, 20.45; N, 12.13. Found: C, 58.79; H, 8.35; Cl, 20.23; N, 11.95.

EXAMPLE VIII

N-(4-Chlorobenzyl)-N'-(n-Decyl)-Guanidine n-Decylamine was treated with N-(4-chlorobenzyl)-S-methylpseudothiourea hydroiodide as in Example III, giving N-(4-chlorobenzyl)-N'-(n-decyl)-guanidine hydroiodide, M.P. 85.5–86.5°, yield 69% of theory.

*Analysis.*—Percent calculated for $C_{18}H_{31}ClIN_3$: C, 47.80; H, 6.92; halogen, 35.97; N, 9.31. Found: C, 47.92; H, 6.92; halogen, 36.31; N, 9.08.

The hydroiodide was converted as in Example I to the hydrochloride salt, M.P. 62–63°, yield quantitative.

*Analysis.*—Percent calculated for $C_{18}H_{31}Cl_2N_2$: C, 59.95; H, 8.67; Cl, 19.68; N, 11.65. Found: C, 59.70; H, 8.69; Cl, 19.55; N, 11.34.

EXAMPLE IX

N-(4-Chlorobenzyl)-N'-(n-Undecyl)-Guanidine

N-undecylamine was treated with N-(4-chlorobenzyl)-S-methylpseudothiourea hydroiodide as in Example III, giving N-(4-chlorobenzyl)-N'-(n-undecyl)-guanidine hydroiodide, M.P. 94–94.5°, yield 95% of theory.

*Analysis.*—Percent calculated for $C_{19}H_{33}ClIN_3$: C, 48.95; H, 7.14; halogen, 34.89; N, 9.02. Found: C, 49.27; H, 7.33; halogen 34.75; N, 8.77.

The hydroiodide was converted as in Example I to the hydrochloride salt, M.P. 65–66°, yield 98% of theory.

*Analysis.*—Percent calculated for $C_{19}H_{33}Cl_2N$: C, 60.93; H, 8.88; Cl, 18.96; N, 11.22. Found: C, 61.05; H, 8.85; Cl, 19.04; N, 11.35.

EXAMPLE X

N-(4-Chlorobenzyl)-N'-(n-Dodecyl)-Guanidine n-Dodecylamine was treated with N-(4-chlorobenzyl)-S-methylpseudothiourea hydroiodide as in Example III, giving N-(4-chlorobenzyl)-N'-(n-dodecyl)-guanidine hydroiodide, M.P. 92–93°, yield 93% of theory.

Analysis.—Percent calculated for $C_{20}H_{35}ClIN_3$: C, 50.08; H, 7.26; halogen, 33.82; N, 8.74. Found: C, 50.12; H, 7.40; halogen, 34.03; N, 8.65.

The hydroiodide was converted as in Example I to the hydrochloride salt, M.P. 65–67°, yield 99% of theory.

Analysis.—Percent calculated for $C_{20}H_{35}Cl_2N_3$: C, 61.80; H, 9.08; Cl, 18.28; N, 10.83. Found: C, 61.53; H, 9.15; Cl, 18.32; N, 10.84.

EXAMPLE XI

N-Benzyl-N'-(n-Octyl)-Guanidine

Benzylthiourea (2.83 parts) was added to methyl iodide (2.42 parts) in ethanol (25 parts), and the solution was allowed to stand at room temperature for 18 hours. The solution was evaporated at room temperature, and the residue was crystallized from ether (80 parts), giving S-methyl-N-benzylseudothiourea hydroiodide, M.P. 99–100°, yield 4.95 parts (94% of theory.)

Analysis.—Percent calculated for $C_9H_{13}IN_2S$: C, 35.08; H, 4.25; I, 41.17; N, 9.09; S, 10.40. Found: C, 35.32; H, 4.32; I, 41.38; N, 8.99; S, 10.46.

N-octylamine was treated with n-benzyl-S-methyl-pseudothiourea hydroiodide as in Example III, giving N-benzyl-N'-(n-octyl)-guanidine hydroiodide, M.P. 70–72°, yield 90% of theory.

Analysis.—Percent calculated for $C_{16}H_{28}IN_3$: C, 49.36; H, 7.25; I, 32.60; N, 10.79. Found: C, 49.47; H, 7.09; I, 32.60; N, 10.71.

The hydroiodide was converted as in Example I to the hydrochloride salt, M.P. 85–86°, yield 74% of theory.

Analysis.—Percent calculated for $C_{16}H_{28}ClN_3$: C, 64.51; H, 9.47; Cl, 11.90; N, 14.11. Found: C. 64.34; H, 9.29; Cl, 12.11; N, 14.56.

EXAMPLE XII

N-Benzyl-N'-(n-Nonyl)-Guanidine

N-nonylamine was treated with N-benzyl-S-methyl-pseudothiourea hydroiodide as in Example III, giving N-benzyl-N'-(n-nonyl)-guanidine hydroiodide, M.P. 84–85°, yield 98% of theory.

Analysis.—Percent calculated for $C_{17}H_{30}IN_3$: C, 50.43; H, 7.50; I, 31.50; N, 10.42. Found: C, 50.43; H, 7.56; I, 31.60; N, 10.50.

The hydroiodide was converted as in Example I to the hydrochloride salt, M.P. 102–103°, yield 91% of theory.

Analysis.—Percent calculated for $C_{17}H_{30}ClN_3$: C, 65.42; H, 9.69; Cl, 11.37; N, 13.48. Found: C, 65.18; H, 9.53; Cl, 11.80; N, 13.59.

EXAMPLE XIII

N-Benzyl-N'-(n-Decyl)-Guanidine n-Decylamine was treated with N-benzyl-S-methyl-pseudothiourea hydroiodide as in Example III, giving N-benzyl-N'-(n-decyl)-guanidine hydroiodide, M.P. 90–91°, yield 96% of theory.

Analysis.—Percent calculated for $C_{18}H_{32}IN_3$: C, 51.80; H, 7.73; I, 30.45; N, 10.04. Found: C, 51.72; H, 7.72; I, 30.42; N, 10.26.

The hydroiodide was converted as in Example I to the hydrochloride salt, M.P. 106–107°, yield 99% of theory.

Analysis.—Percent calculated for $C_{18}H_{32}ClN_3$: C, 66.35; H, 9.90; Cl, 10.88; N, 12.89. Found: C, 66.31; H, 9.76; Cl, 11.16; N, 12.82.

EXAMPLE XIV

N-Benzyl-N'-(n-Undecyl)-Guanidine n-Undecylamine was treated with N-benzyl-S-methyl-pseudothiourea hydroiodide as in Example III, giving N-benzyl-N'-(n-decyl)-guanidine hydroiodide, M.P. 87–89°, yield 90% of theory.

Analysis.—Percent calculated for $C_{19}H_{34}IN_3$: C, 52.90; H, 7.95; I, 29.43; N, 7.94. Found: C, 52.88; H, 8.00; I, 29.24; N, 9.62.

The hydroiodide was converted as in Example I to the hydrochloride salt, M.P. 110–111°, yield 90% of theory.

Analysis.—Percent calculated for $C_{19}H_{34}ClN_3$: C, 67.20; H, 10.08; Cl, 10.42; N, 12.36. Found: C, 67.14; H, 9.97; Cl, 10.68; N, 12.25.

EXAMPLE XV

N-Benzyl-N'-(n-Dodecyl)-Guanidine n-Dodecylamine was treated with N-benzyl-S-methyl-pseudothiourea hydroiodide as in Example III, giving N-benzyl-N'-(n-dodecyl)-guanidine hydroiodide, M.P. 85.5–86.5°, yield 98% of theory.

Analysis.—Percent calculated for $C_{20}H_{36}IN_3$: C, 53.85; H, 8.14; I, 28.55; N, 9.42. Found: C, 54.25; H, 8.00; I, 28.70; N, 9.22.

The hydroiodide was converted as in Example I to the hydrochloride salt, M.P. 113–114°, yield quantitative.

Analysis.—Percent calculated for $C_{20}H_{36}ClN_3$: C, 67.81; H, 10.26; Cl, 10.01; N, 11.88. Found: C, 68.19; H, 10.27; Cl, 10.07; N, 11.89.

What is claimed is:

1. Compounds having the formula

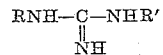

wherein R is one of a group consisting of benzyl, 4-chlorobenzyl and 3,4-dichlorobenzyl and R' is one of a group consisting of a straight chain alkyl radical having from 8 to 12 carbon atoms and 3,4-dichlorobenzyl.

2. N-4-chlorobenzyl-N'-(n-dodecyl)-guanidine.
3. N-3,4-dichlorobenzyl-N'-(n-nonyl)-guanidine.
4. N-3,4-dichlorobenzyl-N'-(n-decyl)-guanidine.
5. N-3,4-dichlorobenzyl-N'-(n-undecyl)-guanidine.
6. N-3,4-dichlorobenzyl-N'-(n-dodecyl)-guanidine.
7. A compound having both bacteriocidal and fungicidal activity selected from the group consisting of N-4-chlorobenzyl-N'-(n-octyl)-guanidine,
N-4-chlorobenzyl-N'-(n-nonyl)-guanidine,
N-4-chlorobenzyl-N'-(n-decyl)-guanidine,
N-4-chlorobenzyl-N'-(n-undecyl)-guanidine,
N-4-chlorobenzyl-N'-(n-dodecyl)-guanidine,
N-3,4-dichlorobenzyl-N'-(n-octyl)-guanidine,
N-3,4-dichlorobenzyl-N'-(n-nonyl)-guanidine,
N-3,4-dichlorobenzyl-N'-(n-decyl)-guanidine,
N-3,4-dichlorobenzyl-N'-(n-undecyl)-guanidine,
N,3,4-dichlorobenzyl-N'-(n-dodecyl)-guanidine and
N,N'-di(3,4-dichlorobenzyl)-guanidine.

References Cited in the file of this patent

UNITED STATES PATENTS

| | | |
|---|---|---|
| 1,805,889 | Schoeller et al. | May 19, 1931 |
| 2,213,474 | Puetzer | Sept. 3, 1940 |

FOREIGN PATENTS

| | | |
|---|---|---|
| 448,796 | Great Britain | June 15, 1936 |
| 603,070 | Great Britain | June 8, 1948 |

OTHER REFERENCES

Mameli et al.: C.A., vol. 51, p. 13868 (1957), QD1A51C2.

Boura et al.: Nature, vol. 191, pp. 1312–1313 (1961), QD1N2.